United States Patent
Rueger et al.

(10) Patent No.: US 10,204,045 B2
(45) Date of Patent: Feb. 12, 2019

(54) DATA FILE HANDLING IN A VOLATILE MEMORY

(71) Applicant: International Business Machines Corporation, Armonk, NY (US)

(72) Inventors: Erik Rueger, Ockenheim (DE); Christof Schmitt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 15/250,987

(22) Filed: Aug. 30, 2016

(65) Prior Publication Data
US 2018/0059931 A1 Mar. 1, 2018

(51) Int. Cl.
*G06F 12/08* (2016.01)
*G06F 12/0804* (2016.01)
*G06F 12/0868* (2016.01)

(52) U.S. Cl.
CPC .......... *G06F 12/08* (2013.01); *G06F 12/0804* (2013.01); *G06F 12/0868* (2013.01); *G06F 2212/1016* (2013.01); *G06F 2212/1032* (2013.01)

(58) Field of Classification Search
None
See application file for complete search history.

(56) References Cited

U.S. PATENT DOCUMENTS

| | | | |
|---|---|---|---|
| 8,972,662 B2 | 3/2015 | Benhase et al. | |
| 9,092,336 B2 | 7/2015 | Atkisson | |
| 9,158,706 B2 | 10/2015 | Benhase et al. | |
| 9,195,396 B2 | 11/2015 | Peterson et al. | |
| 9,251,052 B2 | 2/2016 | Talagala et al. | |
| 9,921,963 B1* | 3/2018 | Li | G06F 12/0833 |
| 2011/0066808 A1* | 3/2011 | Flynn | G06F 12/0246 |
| | | | 711/118 |
| 2013/0111146 A1 | 5/2013 | Ash et al. | |

(Continued)

OTHER PUBLICATIONS

"Page cache", Wikipedia, https://en.wikipedia.org/wiki/Page_cache#Memory_conservation, Accessed online Jun. 13, 2016, 4 pages.

(Continued)

*Primary Examiner* — Edward J Dudek, Jr.
*Assistant Examiner* — Andrew Russell
(74) *Attorney, Agent, or Firm* — Francis Lammes; Stephen J. Walder, Jr.; Robert M. Sullivan (57) ABSTRACT

A mechanism is provided for destaging one or more data files in a volatile memory using a set of heat registers associated with each data file. Responsive to receiving a notification indicating that free space within the volatile memory has fallen below a predetermined threshold, a rule is implemented, based on values associated with the set of heat registers assigned to each data file, to identify a data file to move to a non-volatile memory, where the set of heat registers comprises a content heat register, an access heat register, and a metadata heat register. The data file is moved to the nonvolatile memory. Responsive to determining that the free space fails to have risen above the predetermined threshold, the operations are repeated until the free space rises above the predetermined threshold at which time the set of heat registers assigned to the data files that were moved are deassigned.

20 Claims, 6 Drawing Sheets

(56) References Cited

U.S. PATENT DOCUMENTS

2013/0166831 A1    6/2013  Atkisson et al.
2013/0185475 A1*   7/2013  Talagala .............. G06F 12/0866
                                                          711/102

OTHER PUBLICATIONS

"Tracking file access temperature within a storage pool", IBM Corporation, http://www-01.ibm.com/support/knowledgecenter/STXKQY_4.1.1/com.ibm.spectrum.scale.v4r11.adv.doc/bl1adv_userpool.htm?lang=en, Accessed online on Jun. 13, 2016, 1 page.
Duong, Nam et al., "SCORE: A Score-Based Memory Cache Replacement Policy", JWAC 2010, 1st JILP Workshop on Computer Architecture Competitions: cache replacement Championship, Saint Malo, France, Jun. 2010, 4 pages.

* cited by examiner

DATA FILE HANDLING IN A VOLATILE MEMORY

BACKGROUND

The present application relates generally to an improved data processing apparatus and method and more specifically to mechanisms for improved data file handling in a volatile memory.

Volatile memory, contrary to non-volatile memory, is computer memory that requires power to maintain the stored information. That is, non-volatile memory. (NVM) is a type of computer memory from which stored information may be retrieved even after power to the computing device in which non-volatile memory resides is cycled, i.e. turned off and back on. Examples of non-volatile memory include read-only memory, flash memory, ferroelectric random-access memory (RAM) (F-RAM), most types of magnetic computer storage devices (e.g. hard disk drives, floppy disks, and magnetic tape), optical discs, and early computer storage methods such as paper tape and punched cards.

On the other hand, volatile memory retains its contents while powered on but, when the power is interrupted, the stored data is lost very rapidly or immediately. However, volatile memory provides faster access than forms of non-volatile memory and can protect sensitive information as it becomes unavailable on powered-down. Examples of volatile memory include general-purpose random-access memory (RAM), dynamic random-access memory (DRAM), static random-access memory (SRAM), and cache memory.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for destaging one or more data files in a volatile memory using a set of heat registers associated with each data file. The illustrative embodiments implement a rule for identifying, based on values associated with the set of heat registers assigned to each data file, a data file to move to a non-volatile memory in response to receiving a notification indicating that free space within the volatile memory has fallen below a predetermined threshold. In the illustrative embodiments, the set of heat registers comprises a content heat register, an access heat register, and a metadata heat register. The illustrative embodiments move the data file to the nonvolatile memory. The illustrative embodiments determine whether the free space has risen above the predetermined threshold. The illustrative embodiments repeat the identifying, moving and determining operations in response to the predetermined threshold failing to have risen above the predetermined threshold. The illustrative embodiments deassign the set of heat registers assigned to each of the data files that were moved to the non-volatile memory in response to the predetermined threshold rising above the predetermined threshold.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Data management is the development and execution of architectures, policies, practices, and procedures that properly manage the full data lifecycle needs of an enterprise. Metadata is "data that provides information about other data" and is used to manage the storage of data files within a data storage system. Metadata summarizes basic information about the data file, which makes finding and working with particular instances of data easier. Examples of very basic metadata include an author of the data file, a date the data file was created, a date the data file was modified, a size associated with the data file, or the like.

A data storage system may comprise both non-volatile and volatile memory. Examples of non-volatile memory include read-only memory, flash memory, ferroelectric random-access memory (RAM) (F-RAM), most types of magnetic computer storage devices (e.g. hard disk drives, floppy disks, and magnetic tape), optical discs, and early computer storage methods such as paper tape and punched cards. Examples of volatile memory include general-purpose random-access memory (RAM), dynamic random-access memory (DRAM), static random-access memory (SRAM), and cache memory.

Data resource management of a data storage system that comprises both non-volatile and volatile memory requires movement of data files between the volatile memory and the slower non-volatile memory. One current solution to managing the movement of data files between the various storage components is through a destage controller. Modern data storage systems may be very large, which in turn means that data management often slows down the overall performance of the data storage solution. Further, in the case of small data files, the rnetadata storage may be of a size that is equivalent to the actual data within the data file itself. Currently, when a data file is to be moved from the volatile memory to the non-volatile memory, the destage controller utilizes timestamps, such as a content timestamp, an access timestamp, and a metadata timestamp that are included within the metadata, to move the data file. However, using only timestamps to determine when a data file should be moved between volatile memory and non-volatile memory may move a data file that would be better left where it currently is.

In order to improve data handling between volatile memory and non-volatile memory, the illustrative embodiments provide mechanisms for improving overall data handling performance by introducing a new concept of data management. The mechanisms change metadata semantics within data management by introducing a set of new defined metadata registers that define a "heat" associated with the data file, access to the data file, changes to the metadata associated with the data file, and the like, in order to optimize the destage and/or update processes of the data file. Utilizing the new defined metadata heat registers provides for a heat register driven destage controller, heat register based data management, and heat register based persistent data update.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general-purpose hardware, software instructions stored on a medium such that the instructions are readily executable by specialized or general-purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
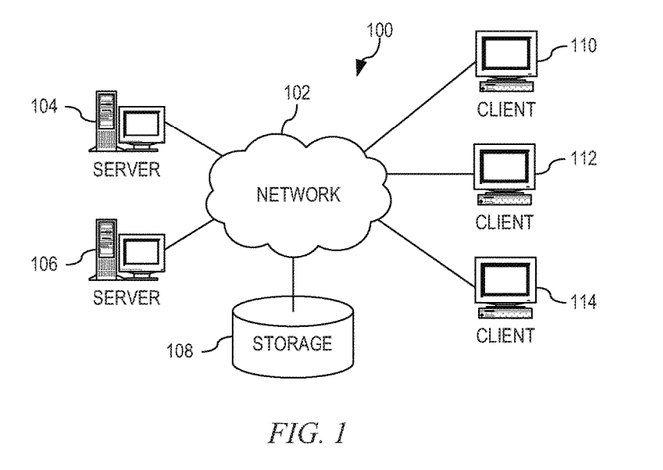
FIG. 1 is an example diagram of a distributed data processing system in which aspects of the illustrative embodiments may be implemented.
Figure 2:
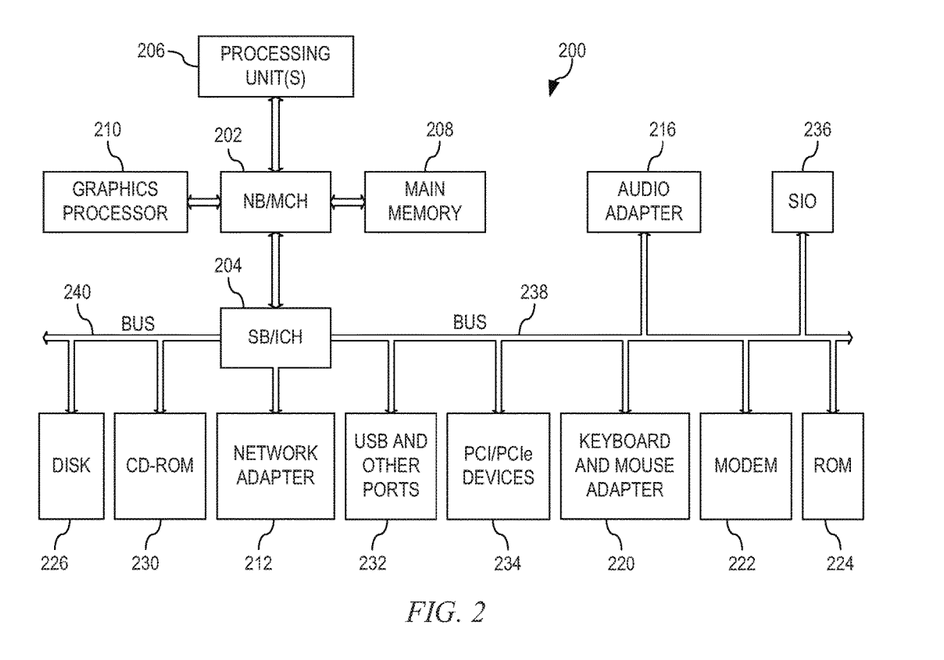
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet. Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement an improved overall data handling performance mechanism. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates improving the overall data handling performance using a set of heat registers.

As noted above, the mechanisms of the illustrative embodiments utilize specifically configured computing devices, or data processing systems, to perform the operations for improved overall data handling performance using a set of heat registers. These computing devices, or data processing systems, may comprise various hardware elements that are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the a mechanism for improving the overall data handling performance using a set of heat registers.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
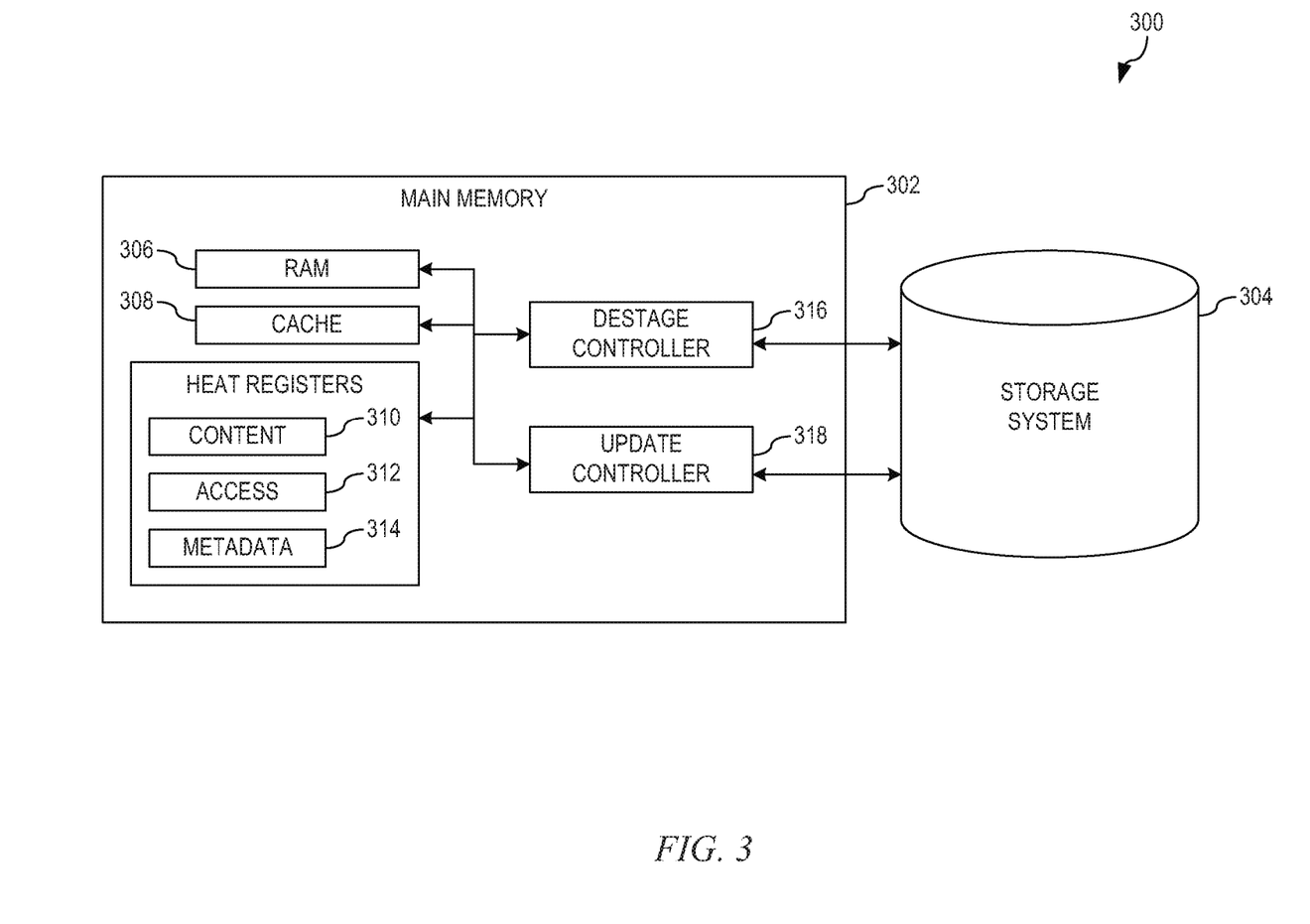
FIG. 3 depicts a functional block diagram of a data handling mechanism that improves overall data handling performance using a set of heat registers in accordance with an illustrative embodiment.

FIG. 3 depicts a functional block diagram of a data handling mechanism that improves overall data handling performance using a set of heat registers in accordance with an illustrative embodiment. Data processing system 300, which is a data processing system such as data processing 200 of FIG. 2, comprises main memory 302, which is a memory similar to main memory 208 of FIG. 2, coupled to storage system 304, which is a storage system such as disk 226 of FIG. 2. Main memory 302 comprises volatile memory such as, for example, general-purpose random-access memory (RAM) 306, cache 308, or the like. Additionally, storage system 304 may be, for example, flash memory, ferroelectric random-access memory (RAM) (F-RAM), hard disk drives, floppy disks, magnetic tape, optical discs, or the like.

For each data file stored within main memory 302, data processing system 300 comprises a set of heat registers 310-314 that are either within main memory 302 (as illustrated) or associated with main memory 302. Destage controller 316, which is controlled by one or more processors, such as processing unit 206 of FIG. 2, controls each of heat registers 310-314. Destage controller 316 increments content heat register 310 by one each time content of an associated file is changed. Destage controller 316 increments access heat register 312 by one each time a file is opened for read access. Destage controller 316 increments metadata heat register 314 by one each time the file metadata, such as user rights, owner or the like, is modified.

When a data file is accessed (read from storage system 304, generated within main memory 302, or the like) and data or metadata associated with the data file not being in main memory 302, as the data file is fetched into main memory 302 from storage system 304 due to a read or generated within main memory 302 due to a new data file being generated, destage controller 316 assigns and initializes a set of heat registers 310-314 for the data file, setting the initial value of each associated heat register 310-314 to 0. With the associated heat registers 310-314 being initialized, destage controller 316 increments the associated access heat register 312 by 1 corresponding to the initial access.

With the fetching of data files and/or generation of data files in main memory 302, main memory 302 will eventually run out of space. In such events, destage controller 316 makes a decision as to which data file to move from main memory 302. Rather than using timestamp information as is utilized in previous destaging implementations, destage controller 316 utilizes heat register information from heat registers 310-314 to implement one or more of the following to decide which data file to move from main memory 302 to storage system 304. Utilizing the set of heat registers 310-314 associated with each data file in main memory 302, responsive to free space within main memory 302 being below a predetermined free space threshold, destage controller 316 may implement a selected one of a set of predefined rules based on user preferences. For example:

For each data file in main memory 302, destage controller 316 calculates the sum of the values from the associated heat registers 310-314 and moves the data file with the lowest calculated value from main memory 302 to storage system 304. This process is repeated until the free space within main memory 302 is above the predetermined free space threshold.

For each data file in main memory 302, destage controller 316 finds the data file with the lowest value in the sum of values from the associated content heat register 310 and the associated access heat register 312 and moves the data file with the lowest calculated value from main memory 302 to storage system 304. This process is repeated until the free space within main memory 302 is above the predetermined free space threshold.

If metadata associated with the data files in main memory 302 takes up more than a predetermined percentage of main memory 302, then, for each data file in main memory 302, destage controller 316 finds the data file with the lowest value in metadata heat register 314 and moves the data file with the lowest value from main memory 302 to storage system 304. This process is repeated until the free space within main memory 302 is above the predetermined free space threshold and/or the metadata associated with the data files in main memory 302 is less than the predetermined percentage of main memory 302.

For each data file in main memory 302, among all data files with a non-zero value in the associated metadata heat register 314 or in the associated content heat register 310, destage controller 316 determines the data file with the lowest value in the associated access heat register 312 and moves the data file with the lowest value from main memory 302 to storage system 304. This process is repeated until the free space within main memory 302 is above the predetermined free space threshold.

For the data files in main memory 302, if the data files with a zero value in their associated content heat register 310 and metadata heat register 314 utilizes more than a predefined percentage of main memory 302, then, from the data files with a zero value in their associated content heat register 310 and the associated metadata heat register 314, destage controller 316 determines the data file with the lowest value in the associated access register 312 and moves the data file with the lowest calculated value from main memory 302 to storage system 304. This process is repeated until the free space within main memory 302 is above the predetermined free space threshold and/or data files with a zero value in their associated content heat register 310 and metadata heat register 314 is less than the predefined percentage of main memory 302.

Once destage controller 316 has implemented the selected predefined rule and the free space within main memory 302 is above the predetermined free space threshold, destage controller 316 deassigns the set of heat registers from data files that have been moved from main memory 302 to storage system 304 for use on another data file when generated or fetched into main memory 302.

In order to further improve overall performance, one additional embodiment includes destage controller 316 determining whether the updates that have been made to a particular data file warrants updating in storage system 304. That is, for example, sometimes metadata may be updated in a manner which may not be required to be updated at destage time, such as when the change is to the 'last access time' or 'last access user' portion of the metadata. Thus, destage controller 316 may, prior to updating changes to a data file from main memory 302 to storage system 304, identify what exact changes were made and if the changes are only to an item that is not required to be updated in storage system 304, then destage controller 316 may simply skip the update process for that data file.

While the above options address the free space threshold issues with regard to the free space within main memory 302, the heat register information within heat registers 310-314 may also be utilized by administrators to compare data files via a ranking based on values within a specified heat register or set of heat registers. That is, as one example, the administrator may ask what the most accessed data file is, and destage controller 316 would identify the data file from the set of data files in main memory 302 with the highest value in the access heat register 312. As another example, the administrator may ask which file has the most changes, and destage controller 316 would identify the data file in the set of data files in main memory 302 with the highest combined value from content heat register 310 and metadata heat register 314. As still another example, the administrator may ask which file has the most changes using weighted values, such as content changes are weighted at 80% and metadata changes are weighted at 20%. Thus, destage controller 316 would identify the data file in the set of data files in main memory 302 with the highest combined and weighted value from content heat register 310 and metadata heat register 314. That is, when a query is sent from an administrator to the destage controller 316, destage controller 316 may:

Identify the data file within main memory 302 with the highest value in its associated content heat register 310 and return one or more pieces of information associated with the data file to the administrator.

Identify the data file within main memory 302 with the highest value in its associated access heat register 312 and return one or more pieces of information associated with the data file to the administrator, Identify the data file within main memory 302 with the highest value in its associated metadata heat register 314 and return one or more pieces of information associated with the data file to the administrator.

As a further illustrative embodiment, the heat register information within heat registers 310-314 may also be utilized in persistent data updates. That is, even if the main memory is not running out of free space, i.e. the free space within main memory 302 fails to be below the predetermined free space threshold, data files within main memory 302 may need to be updated within storage system 304 in the event of a failure in main memory 302 or issues with data processing system 300 as a whole. Thus, when a data file within main memory 302 is updated, based on the value of the content heat register 310 associated with the data file changing from a previous value thereby indicating that the content of the data file has changed or based on the value of the metadata heat register 314 associated with the data file changing thereby indicating that the file metadata, such as user rights, owner or the like, has been modified. For each data file meeting one or both of these conditions, update controller 318 performs a persistent data update by updating the associated data file information in storage system 304 even though main memory 302 is not running out of free space and a real destage is not required. Update controller 318 performs this update to keep the persisted data more frequently up-to-date, which provides a higher data protection level. In order to track updates that are persisted to storage system 304 and so as not to duplicate updates at a later time, update controller 318 utilizes an update timestamp that identifies when the last update was performed and, based on this update timestamp and the timestamps associated with subsequent changes, performs a persistent data update of only the changed data from the main memory 302 to storage system 304.

However, while performing persistent data updates provides for a higher data protection level, performing the persistent data update each time the value of the content heat register 310 associated with the data file changes or each time the value of the metadata heat register 314 associated with the data file is modified, performance of data processing system 300 in handling other tasks may be degraded. Accordingly, the illustrative embodiments provide for persistent data updates based on a set of frequency parameters. That is, avoiding unnecessary persistent data updates helps in keeping stored data more robust and minimizes the performance impact associated with frequent persistent data updates. Thus, for each of the content heat registers 310, access heat registers 312, and metadata heat registers 314, there is an associated frequency parameter to be met before the persistent update is performed. That is, for each heat register, regardless of an update being performed, the update will not be persisted to the storage system 304 unless the frequency parameter has been met.

For example, for a particular data file, a marker 'A' defines an actual update timestamp where the metadata and/or data was updated in storage system 304 due to a persistent update or when a data file was accessed. Based on the update timestamp 'A,' update controller 318 calculates a marker 'X' based on a predetermined frequency parameter, for example, one hour for a content change to the data file, ten minutes for a data file access, and two hours for a metadata change to the data file. Each time a new access is performed, metadata is changed, or content is updated, the time associated with the access/change is recorded and compared to the associated predetermined frequency parameter. If the access or change is at a time between the update timestamp 'A' and the marker 'X', the access or change will not be reflected in storage system 304. However, once a time associated with the marker 'X' has been met and a change to the metadata or data of the data file has occurred, then the persistent update of the data and/or metadata associated with the data file will be persisted to storage system 304. Once again, in order to track updates that are persisted to storage system 304 and so as not to duplicate updates at a later time, update controller 318 utilizes an update timestamp that identifies when the last update was performed and, based on this update timestamp and the timestamps associated with subsequent changes, performs a persistent data update of only the changed data from the main memory 302 to storage system 304.

Therefore, the illustrative embodiments provide mechanisms for improving overall data handling performance by introducing heat registers. Utilizing "heat" values associated with data changes, metadata changes, and/or access to the data file optimize the destage and/or update processes of the data. Utilizing the new defined metadata heat registers provides for a heat register driven destage controller, heat register based data management, and heat register based persistent data updates.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firework, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
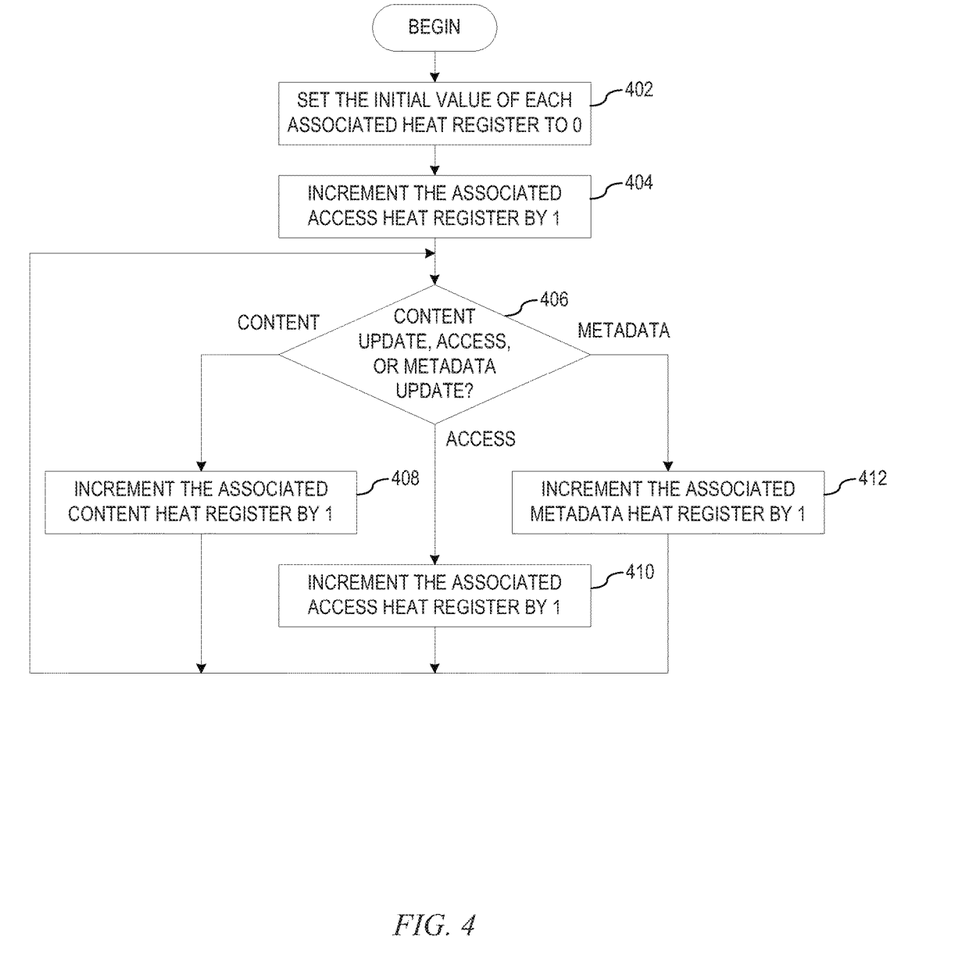
FIG. 4 depicts a flowchart of the operation performed in initializing and updating a set of heat registers associated with a data file in a main memory in accordance with an illustrative embodiment.

FIG. 4 depicts a flowchart of the operation performed in initializing and updating a set of heat registers associated with a data file in a main memory in accordance with an illustrative embodiment. As the operation beings, as the data file is generated in the main memory or read from a storage system into the main memory, a destage controller assigns and initializes a set of heat registers, i.e. a content heat register, an access heat register, and a metadata heat register, for the data file, setting the initial value of each associated heat register to 0 (step 402). Based on this initial access, the destage controller increments the associated access heat register by one (step 404). The destage controller then waits for a next content update, access, or metadata update to the data file (step 406). If at step 406 the destage controller detects a content update to the data file, the destage controller increments the associated content heat register by one (step 408), with the operation returning to step 406 thereafter. If at step 406, the destage controller detects an access to the data file, the destage controller increments the associated access heat register by one (step 410), with the operation returning to step 406 thereafter. If at step 406 the destage controller detects a metadata update to the data file, the destage controller increments the associated metadata heat register by one (step 412), with the operation returning to step 406 thereafter.

Figure 5:
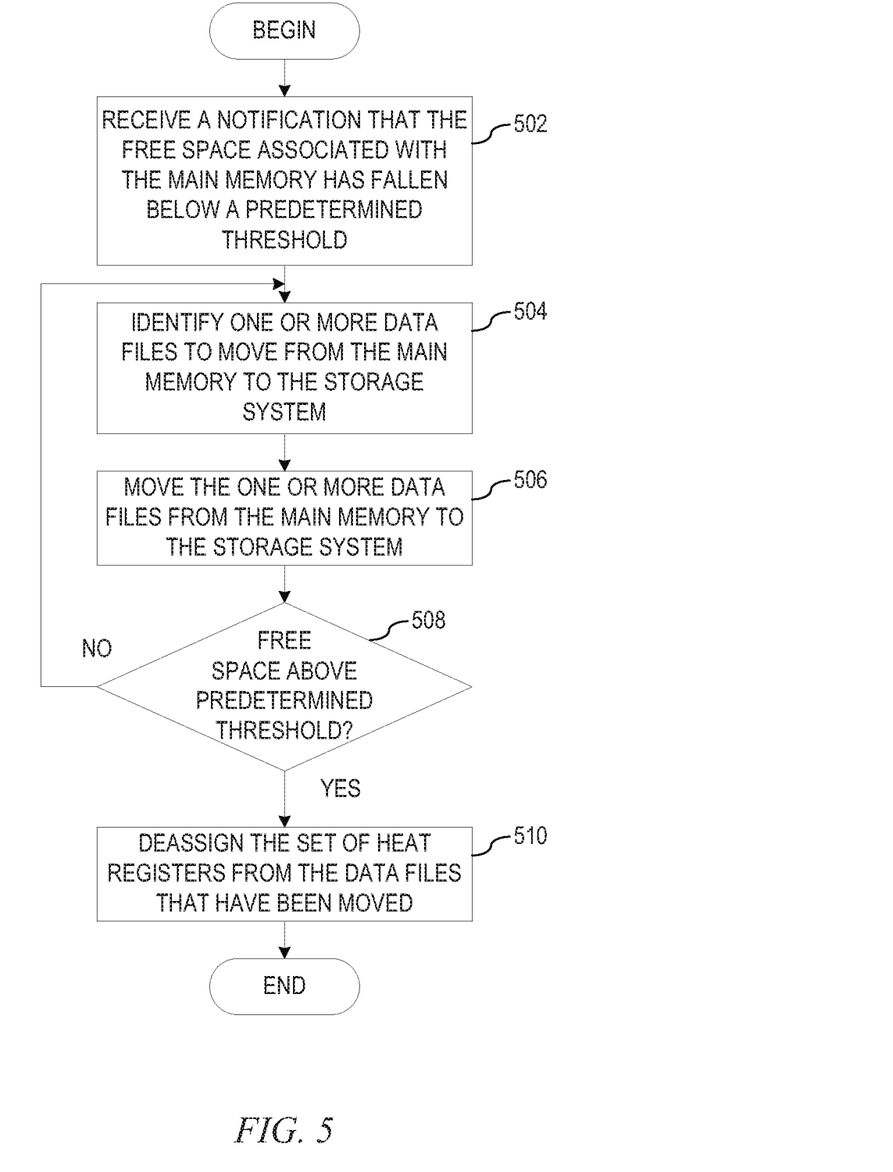
FIG. 5 depicts a flowchart of the operation performed in destaging one or more data files in a main memory using a set of heat registers associated with each data file in accordance with an illustrative embodiment.

FIG. 5 depicts a flowchart of the operation performed in destaging one or more data files in a main memory using a set of heat registers associated with each data file in accordance with an illustrative embodiment. As the operation beings, a destage controller receives a notification that the free space associated with the main memory has fallen below a predetermined threshold (step 502). Responsive to receiving the notification, the destage controller determines which of a set of predefined rules to implement based on user preferences. The set of predefined rules may comprise:

For each data file in the main memory, the destage controller calculates the sum of the values from the associated heat registers and moves the data file with the lowest calculated value from the main memory to the storage system. This process is repeated until the free space within the main memory is above the predetermined free space threshold.

For each data file in the main memory, the destage controller finds the data file with the lowest value in the sum of values from the associated content heat register and the associated access heat register and moves the data file with the lowest calculated value from the main memory to the storage system. This process is repeated until the free space within the main memory is above the predetermined free space threshold.

If metadata associated with the data files in the main memory takes up more than a predetermined percentage of the main memory, then, for each data file in the main memory, the destage controller finds the data file with the lowest value in the metadata heat register and moves the data file with the lowest value from the main memory to the storage system. This process is repeated until the free space within the main memory is above the predetermined free space threshold and/or the metadata associated with the data files in the main memory is less than the predetermined percentage of the main memory.

For each data file in the main memory, among all data files with a non-zero value in the associated metadata heat register or in the associated content heat register, the destage controller determines the data file with the lowest value in the associated access heat register and moves the data file with the lowest value from the main memory to the storage system. This process is repeated until the free space within the main memory is above the predetermined free space threshold.

For the data files in the main memory, if the data files with a zero value in their associated content heat register and metadata heat register utilizes more than a predefined percentage of the main memory, then, from the data files with a zero value in their associated content heat register and the associated metadata heat register, the destage controller determines the data file with the lowest value in the associated access register and moves the data file with the lowest calculated value from the main memory to storage system. This process is repeated until the free space within the main memory is above the predetermined free space threshold and/or data files with a zero value in their associated content heat register and metadata heat register is less than the predefined percentage of the main memory.

In general, the destage controller identifies one or more data files to move from the main memory to the storage system (step 504) and moves the one or more data files from the main memory to the storage system (step 506). Moving the identified one or more data files may be actually copying the data file from the main memory to the storage system if the data file does not exist on the storage system or updating an existing data file on the storage system with updates made to the data file in the main memory. The destage controller then determines whether the free space associated with the main memory has risen above the predetermined threshold (step 508). If at step 508 the destage controller determines that the free space associated with the main memory has failed to rise above the predetermined threshold, the operation returns to step 504. If at step 508 the destage controller determines that the free space associated with the main memory has risen above the predetermined threshold, then the destage controller deassigns the set of heat registers from the data files that have been moved from the main memory to the storage system for use on another data file when generated or fetched into the main memory (step 510), with the operation terminating thereafter.

Figure 6:
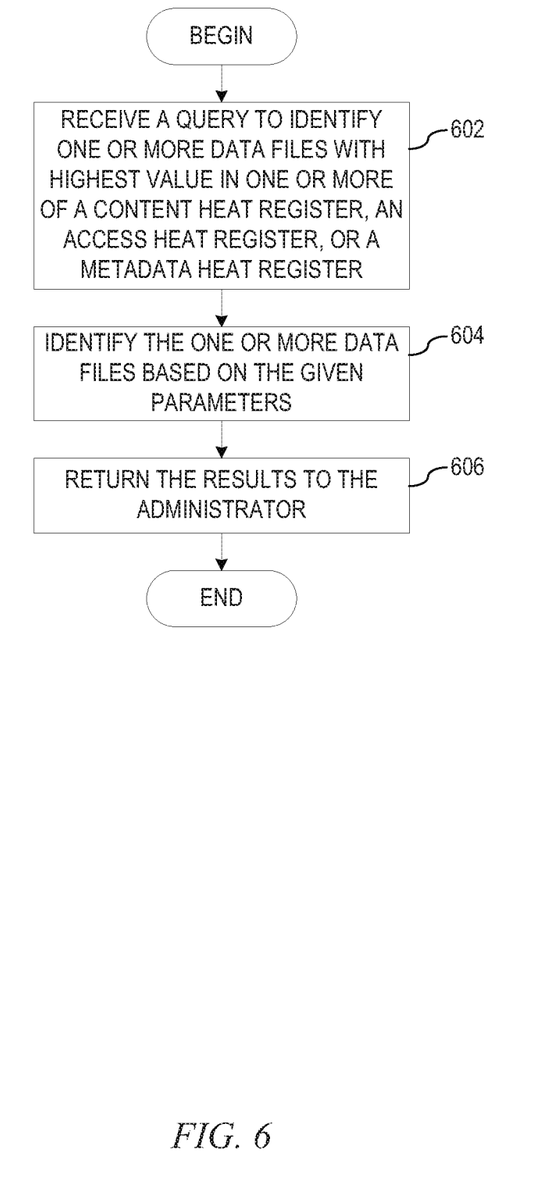
FIG. 6 depicts a flowchart of the operation performed in identifying, based on a query from an administrator, a data file in a main memory using a set of heat registers associated with a data file in accordance with an illustrative embodiment.

FIG. 6 depicts a flowchart of the operation performed in identifying, based on a query from an administrator, a data file in a main memory using a set of heat registers associated with a data file in accordance with an illustrative embodiment. As the operation begins, the destage controller receives a query to identify one or more data files with highest value, combined value, or combined/weighted value in one or more of a content heat register, an access heat register, and/or a metadata heat register (step 602). Based on the specific requirements of the query, the destage controller identifies the one or more data files based on the given parameters (step 604) and returns the results to the administrator (step 606), with the operation terminating thereafter.

Figure 7:
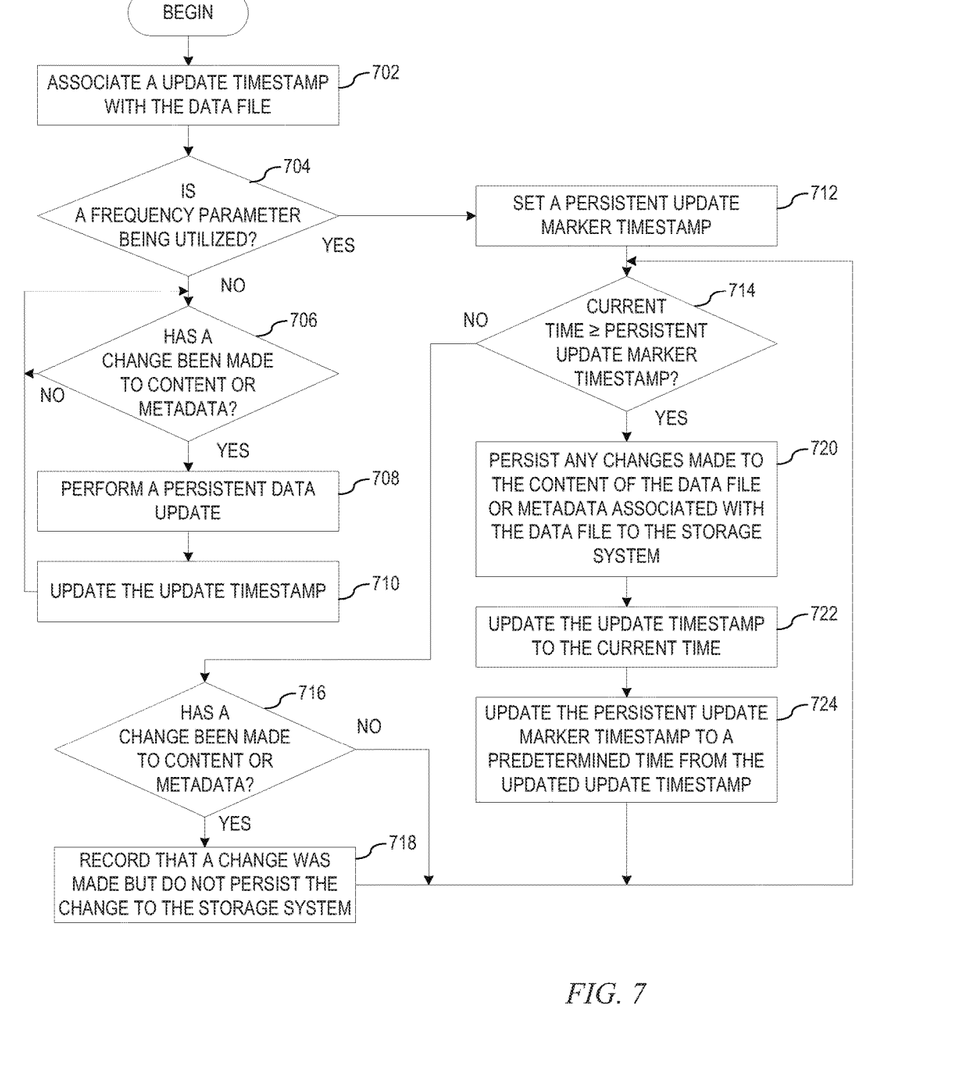
FIG. 7 depicts a flowchart of the operation performed in making persistent data updates for a data file in a main memory using a set of heat registers associated with a data file in accordance with an illustrative embodiment.

FIG. 7 depicts a flowchart of the operation performed in making persistent data updates for a data file in a main memory using a set of heat registers associated with a data file in accordance with an illustrative embodiment. As the operation begins, when a data file is first stored in main memory or when a content or metadata change is made to a data file already in main memory, an updated controller associates an update timestamp with the data file (step 702). The update controller then determines whether a frequency parameter is to be utilized for performing persistent updates (step 704). If at step 704 a frequency parameter is not utilized, the update controller determines whether a change has been made to the content of the data file or metadata associated with the data file (step 706). If at step 706 the update controller determines that the content of a data file or metadata associated with the data file has changed, the update controller performs a persistent data update of the changes from the main memory to the storage system (step 708). The update controller then updates the update timestamp to reflect the last time the data was persisted to the storage system (step 710), with the operation returning to step 706 thereafter. If at step 706 the update controller determines that the content of a data file or metadata associated with the data file has not changed, the operation returns to step 706.

If at step 704 a frequency parameter is utilized, the update controller sets a persistent update marker timestamp at a predetermined time from the update timestamp (step 712). The update controller then determines whether a current time is equal to or greater than the persistent update marker timestamp (step 714). If at step 714 the current, time is not equal to or greater than the persistent update marker timestamp, the update controller determines whether a change has been made to the content of the data file or metadata associated with the data file (step 716). If at step 716 the update controller determines that a change to the content of the data file or metadata associated with the data file has been made, the update controller records that a change was made but does not persist the change to the storage system (step 718), with the operation retuning to step 714. If at step 716 the update controller determines that no change was made to the content of the data file or metadata associated with the data file, the operation returns to step 714.

If at step 714 the current time is equal to or greater than the persistent update marker timestamp, the update controller persists any changes made to the content of the data file or metadata associated with the data file to the storage system (step 720). The update controller then updates the update timestamp to the current time (step 722) and updates the persistent update marker timestamp to a predetermined time from the updated update timestamp (step 724), with the operation returning to step 714 thereafter.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for improving overall data handling performance by introducing heat registers. Utilizing "heat" values associated with data changes, metadata changes, and/or access to the data file optimize the destage and/or update processes of the data. Utilizing the new defined metadata heat registers provides for a heat register driven destage controller, heat register based data management, and heat register based persistent data updates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, hulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for destaging one or more data files in a volatile memory using a set of heat registers associated with each data file, the method comprising:

responsive to receiving a notification indicating that free space within the volatile memory has fallen below a predetermined threshold, implementing a rule for identifying, based on values associated with the set of heat registers assigned to each data file, a data file to move to a non-volatile memory, wherein the set of heat registers comprises a content heat register, an access heat register, and a metadata heat register;

moving the data file to the nonvolatile memory;

determining whether the free space has risen above the predetermined threshold;

responsive to the free space failing to have risen above the predetermined threshold, repeating the identifying, moving and determining operations;

responsive to the free space rising above the predetermined threshold, deassigning the set of heat registers assigned to each of the data files that were moved to the non-volatile memory;

responsive to content of the data file or metadata associated with the data file changing and a frequency parameter being utilized, determining whether a current time is equal to or greater than a predetermined time from a time associated with a previous update of the data file to the non-volatile memory; and responsive to the current time failing to be equal to or greater than the predetermined time from the time associated with the previous update of the data file to the non-volatile memory, recording that the change was made but not persisting the change from the volatile memory to the non-volatile memory.

2. The method of claim 1, wherein the rule is, for each data file in the volatile memory, calculating a sum of values from the set of heat registers and selecting the data file with the lowest calculated sum of values from the main memory to the storage system.

3. The method of claim 1, wherein the rule is, for each data file in the volatile memory, identifying the data file with the lowest value in the sum of values from the content heat register and the access heat register.

4. The method of claim 1, wherein the rule is, responsive to metadata associated with all data files in the volatile memory consuming more than a predetermined percentage of the volatile memory, for each data file in the volatile memory, identifying the data file with the lowest value in the metadata heat register.

5. The method of claim 1, wherein the rule is, for each data file in the volatile memory, among all data files with a non-zero value in the associated metadata heat register or in the associated content heat register, identifying the data file with the lowest value in the associated access heat register.

6. The method of claim 1, wherein the rule is, responsive to data files with a zero value in their associated content heat register and metadata heat register utilizing more than a predefined percentage of the volatile memory, from the data files with the zero value in their associated content heat register and the associated metadata heat register, identifying the data file with the lowest value in the associated access register.

7. The method of claim 1, wherein the access heat register is incremented by a predetermined value each time the data file is accessed, wherein the content heat register is incremented by a predetermined value each time content of the dam file changes, and wherein the metadata heat register is incremented by a predetermined value each time metadata associated with the data file changes.

8. A computer program product comprising a computer readable storage medium having a computer readable program stored therein, wherein the computer readable program, when executed on a computing device, causes the computing device to:

responsive to receiving a notification indicating that free space within a volatile memory has fallen below a predetermined threshold, implement a rule for identifying, based on values associated with a set of heat registers assigned to each data file, a data file to move to a non-volatile memory, wherein the set of heat registers comprises a content heat register, an access heat register, and a metadata heat register;

move the data file to the nonvolatile memory;

determine whether the free space has risen above the predetermined threshold;

responsive to the free space failing to have risen above the predetermined threshold, repeat the identifying, moving and determining operations;

responsive to the free space rising above the predetermined threshold, deassign the set of heat registers assigned to each of the data files that were moved to the non-volatile memory;

responsive to content of the data file or metadata associated with the data file changing and a frequency parameter being utilized, determine whether a current time is equal to or greater than a predetermined time from a time associated with a previous update of the data file to the non-volatile memory; and responsive to the current time failing to be equal to or greater than the predetermined time from the time associated with the previous update of the data file to the non-volatile memory, record that the change was made but not persisting the change from the volatile memory to the non-volatile memory.

9. The computer program product of claim 8, wherein the rule is, for each data file in the volatile memory, calculating a sum of values from the set of heat registers and selecting the data file with the lowest calculated sum of values from the main memory to the storage system.

10. The computer program product of claim 8, wherein the rule is, for each data file in the volatile memory, identifying the data file with the lowest value in the sum of values from the content heat register and the access heat register.

11. The computer program product of claim 8, wherein the rule is, responsive to metadata associated with all data files in the volatile memory consuming more than a predetermined percentage of the volatile memory, for each data file in the volatile memory, identifying the data file with the lowest value in the metadata heat register.

12. The computer program product of claim 8, wherein the rule is, for each data file in the volatile memory, among all data files with a non-zero value in the associated metadata heat register or in the associated content heat register, identifying the data file with the lowest value in the associated access heat register.

13. The computer program product of claim 8, wherein the rule is, responsive to data files with a zero value in their associated content heat register and metadata heat register utilizing more than a predefined percentage of the volatile memory, from the data files with the zero value in their associated content heat register and the associated metadata heat register, identifying the data file with the lowest value in the associated access register.

14. The computer program product of claim 8, wherein the access heat register is incremented by a predetermined value each time the data file is accessed, wherein the content heat register is incremented by a predetermined value each time content of the data file changes, and wherein the metadata heat register is incremented by a predetermined value each time metadata associated with the data file changes.

15. An apparatus comprising:
a processor; and
a memory coupled to the processor, wherein the memory comprises instructions which, when executed by the processor, cause the processor to:

responsive to receiving a notification indicating that free space within a volatile memory has fallen below a predetermined threshold, implement a rule for identifying, based on values associated with a set of heat registers assigned to each data file, a data file to move to a non-volatile memory, wherein the set of heat registers comprises a content heat register, an access heat register, and a metadata heat register;

move the data file to the nonvolatile memory;

determine whether the free space has risen above the predetermined threshold;

responsive to the free space failing to have risen above the predetermined threshold, repeat the identifying, moving and determining operations;

responsive to the free space rising above the predetermined threshold, deassign the set of heat registers assigned to each of the data files that were moved to the non-volatile memory;

responsive to content of the data file or metadata associated with the data file changing and a frequency parameter being utilized, determine whether a current time is equal to or greater than a predetermined time from a time associated with a previous update of the data file to the non-volatile memory; and responsive to the current time failing to be equal to or greater than the predetermined time from the time associated with the previous update of the data file to the non-volatile memory, record that the change was made but not persisting the change from the volatile memory to the non-volatile memory.

16. The apparatus of claim 15, wherein the rule is, for each data file in the volatile memory, calculating a sum of values from the set of heat registers and selecting the data file with the lowest calculated sum of values from the main memory to the storage system.

17. The apparatus of claim 15, wherein the rule is, for each data file in the volatile memory, identifying the data file with the lowest value in the sum of values from the content heat register and the access heat register.

18. The apparatus of claim 15, wherein the rule is, responsive to metadata associated with all data files in the volatile memory consuming more than a predetermined percentage of the volatile memory, for each data file in the volatile memory, identifying the data file with the lowest value in the metadata heat register.

19. The apparatus of claim 15, wherein the rule is, for each data file in the volatile memory, among all data files with a non-zero value in the associated metadata heat register or in the associated content heat register, identifying the data file with the lowest value in the associated access heat register.

20. The apparatus of claim 15, wherein the rule is, responsive to data files with a zero value in their associated content heat register and metadata heat register utilizing more than a predefined percentage of the volatile memory, from the data files with the zero value in their associated content heat register and the associated metadata heat register, identifying the data file with the lowest value in the associated access register.

* * * * *